United States Patent [19]

Jackson

[11] Patent Number: 4,945,188

[45] Date of Patent: Jul. 31, 1990

[54] BUS SYSTEM

[75] Inventor: Raymond T. Jackson, Brighton East, Australia

[73] Assignee: Cableware Pty. Ltd., Australia

[21] Appl. No.: 311,828

[22] Filed: Feb. 17, 1989

[51] Int. Cl.⁵ .......................... H02G 5/06; H02G 5/10
[52] U.S. Cl. .................................. 174/16.2; 174/68.2; 174/70 B; 174/88 B; 174/99 B; 361/378; 439/212; 439/213
[58] Field of Search ................... 174/16.2, 68.2, 70 B, 174/71 B, 88 B, 99 B; 439/210, 212, 213; 361/378

[56] References Cited

U.S. PATENT DOCUMENTS

| | | | |
|---|---|---|---|
| Re. 26,310 | 11/1967 | Moodie et al. | 174/16.2 X |
| 3,384,702 | 5/1968 | Stevens | 174/68.2 |
| 3,401,230 | 9/1968 | Giger, Jr. | 174/99 B |
| 3,571,488 | 3/1971 | Douglass | 174/88 B X |
| 3,584,138 | 6/1971 | Pritzen, Jr. | 174/99 B X |
| 3,681,509 | 8/1972 | Johnston et al. | 174/16.2 |
| 3,730,971 | 5/1973 | Durham et al. | 174/88 B X |
| 3,732,353 | 5/1973 | Koenig et al. | 174/99 B X |
| 3,956,574 | 5/1976 | Weimer | 174/68.2 |
| 4,141,054 | 2/1979 | Colaiaco | 174/16.2 X |
| 4,404,423 | 9/1983 | Sakakibara et al. | 174/27 |
| 4,804,804 | 2/1989 | Hibbert et al. | 174/16.2 |

FOREIGN PATENT DOCUMENTS

| | | |
|---|---|---|
| 220665 | 2/1959 | Australia . |
| 269698 | 9/1966 | Australia . |
| 270992 | 10/1966 | Australia . |
| 277837 | 8/1967 | Australia . |
| 403375 | 5/1970 | Australia . |
| 451862 | 8/1974 | Australia . |
| 460912 | 4/1975 | Australia . |
| 469090 | 1/1976 | Australia . |
| 472046 | 4/1976 | Australia . |
| 503231 | 8/1979 | Australia . |

OTHER PUBLICATIONS

I-Line Busway, Manual 5600; Saxon; Nov., 1975.
Abridgment Reference—Complete Specification Australian No. 503,231, 8/79.

Primary Examiner—Morris H. Nimmo
Attorney, Agent, or Firm—Evenson, Wands, Edwards, Lenahan & McKeown

[57] ABSTRACT

A bus bar and duct combination as is disclosed comprising a plurality of bus bars encased and held, at a central part between end joint parts of the bus bars, within a metal duct such that the bus bars, the duct and electrical insulation members are in intimate contact to provide heat transfer from the bus bars to the duct by way of conduction.

6 Claims, 6 Drawing Sheets

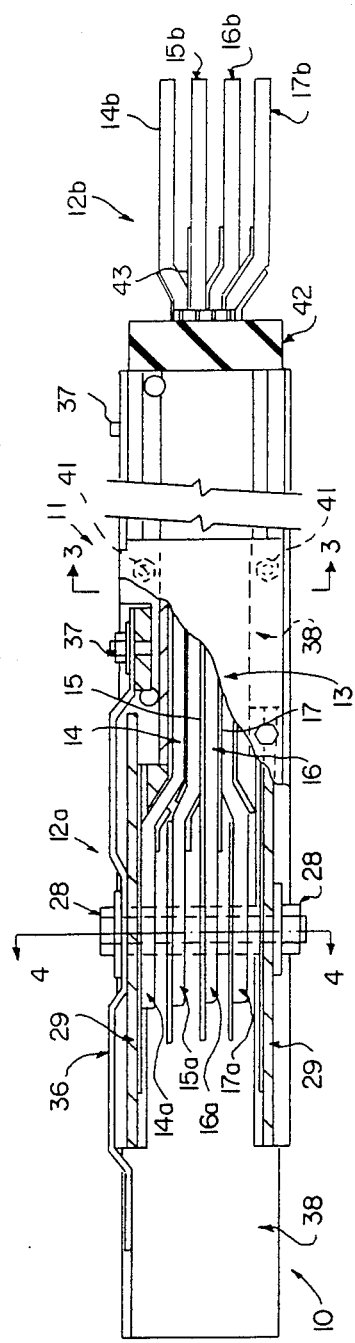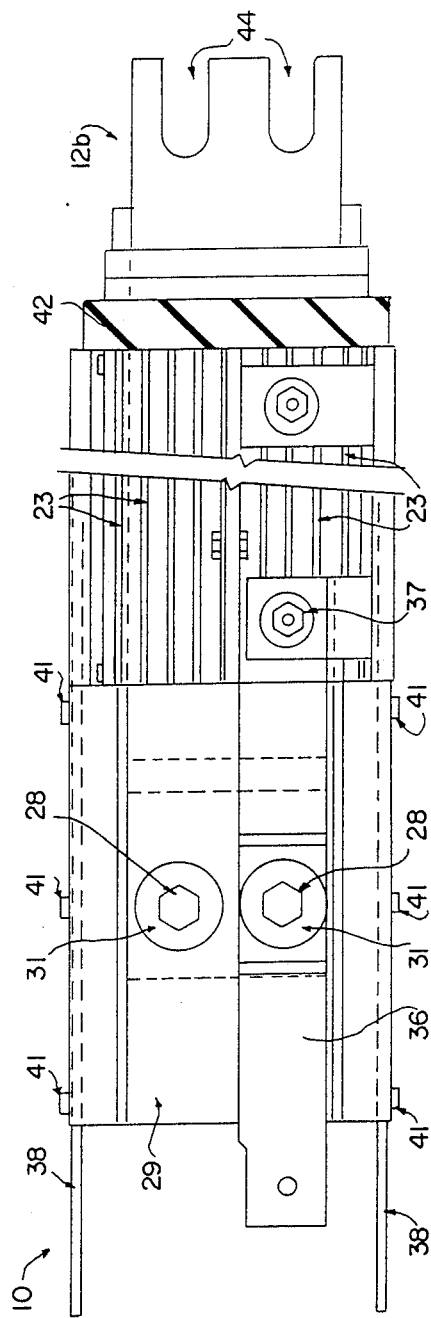

ved by means of suitable fish or joining plates.
BUS SYSTEM

BACKGROUND AND SUMMARY OF THE INVENTION

This invention relates to bus systems for electrical distribution and relates particularly but not exclusively to bus ducting systems and to apparatus for bus take off connections.

Most presently known and used bus bar and bus bar duct systems are bulky due to the presence of airways along the ducts. These airways provide electrical clearance of the bus bars and cooling is effected wholly or partly by convection. Such cooling by convection is not an efficient or quick method of heat dissipation from the bus bars. Another reason for the bulkiness of presently known and used systems is the necessity to provide mechanical reinforcement of the bus bars to restrain the bars against violent deformation should a short circuit or overload cause reactance between neighboring bus bars. This reinforcement is usually effected by means of discrete insulating supports within the duct or by continuously wrapping a group of bus bars with an insulating material of suitable strength. Such methods invariably include additional air pockets, large or small, which result in convection heat transfer from the bus bars when heating occurs. Furthermore, known bus bar systems have lower current ratings due to low contact pressures between serially connected bus bar lengths or great cost due to the necessity to e.g. tin plate the joining tongues of bus bars.

It is the object or objects of this invention to reduce or overcome some or all of the disadvantages of the currently used bus bars and/or bus bar duct systems.

The present invention therefore provides in one preferred form a bus bar and duct combination comprising a plurality of bus bars encased and held, at a central part between end joint parts of the bus bars, within a metal duct such that the bus bars, the duct and electrical insulation members are in intimate contact to provide heat transfer from the bus bars to the duct by way of conduction. Furthermore the duct provides full mechanical support for the bus bars and thus internal reinforcement means are not required. Preferably the bus bars are substantially entirely made of copper or aluminium and the duct is of extruded aluminium having a plurality of integrally formed cooling fins around at least a major portion of the periphery of the duct. Preferably the duct is formed of two, or two pairs of, symmetrical substantially U shaped cross-sectional complimentary duct sections. Preferably the bus bars and duct are separated from one another by individual electrically insulating members. Preferably the combination includes a separate extruded rubber sealing and electrically insulating member between the sides of the bus bars and the sides of the duct which interleave with the insulating members between and extending laterally of the individual bus bars. Preferably the insulating member between the bus bars or bus bars and the duct consists of a plurality of sheets but may consist of a single insulating sheet. Preferably, one or more bus bar and duct combination(s) are adapted for modulator interconnection or coupling.

The present invention also provides a bus to the duct combination comprising a plurality of bus bars encased and held, at a central part between end joint parts of the bus bars, within a metal duct such that the bus bars, the duct and electrical insulation members are in intimate contact to provide heat transfer from the bus to the duct by way of conduction in which the duct is formed of constant cross-section extruded metal duct sections. Preferably the metal of the duct sections is aluminium or aluminium alloy. Preferably the duct sections have a plurality of integrally formed cooling fins around the periphery of the duct formed from the duct sections to enhance radiation of heat from the combination and to increase the mechanical strength of the combination to guard against mechanical failure of the combination in the event of an electrical overload when a plurality of bus bar and duct combinations are used in an electrical supply system.

Further the invention provides a bus bar and duct combination as described above in which the joint sections are adapted for coupling with other bus bar and duct combination(s) and is provided by splaying of the bus bars external of each end of the duct to form substantially parallel spaced bus bar sections which can be interleaved with another bus bar and duct combination in series. Modular bar and duct combinations facilitate interconnection with other bus bar and duct combinations. Appropriate insulation is provided at the joint section between the , pairs of bus bar joint sections. Preferably the bus bars have laterally extending U shaped slots therein to accommodate appropriate joint holding means such as bolts and nuts. Preferably the joint is covered above and below by suitable insulating means and cover plates. Preferably the joint is covered on each side and strengthened against movement or deformation by means of suitable fish or joining plates. Preferably there is provided additional means to connect each bus bar duct combination to provide appropriate earthing of the combination.

BRIEF DESCRIPTION OF THE DRAWINGS

Preferred forms of the invention will now be described with reference to the accompanying drawings in which:

FIG. 1 is a partial cut away side view of a bus bar and duct combination in accordance with the invention;

FIG. 2 is a partial top view of the combination of FIG. 1 showing both end connecting portions;

DETAILED DESCRIPTION OF THE DRAWINGS

Figure 3:
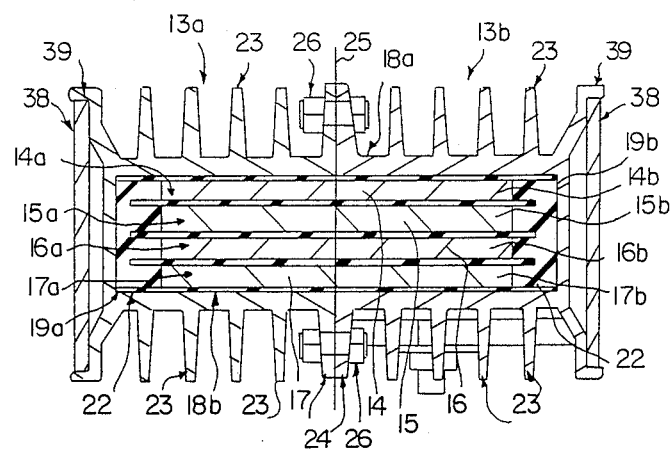
FIG. 3 is a cross-sectional view in the direction B—B of FIG. 1.

Referring to FIGS. 1-5, there is shown a bus bar and duct combination 10 having a central part 11 and end or joint sections 12a or 12b. As best seen in FIGS. 1 and 3, the central part 11 of the combination includes duct 13 and one neutral and three active phase and bus bars 14, 15, 16 and 17. As shown in FIG. 3, the duct 13 comprises two extruded metal duct sections 13a, 13b of substantially U shaped cross-section which are connectable together to form the duct 13 and to enclose a passageway of substantially rectangular cross-section having upper and lower walls 18a, 18b and side walls 19a, 19b. The passageway contains bus bars 14, 15, 16 and 17 which are of substantially rectangular cross-section (as is usual) and extend beyond the ends of the duct 13 to form joint parts as will be described later.

Figure 5:
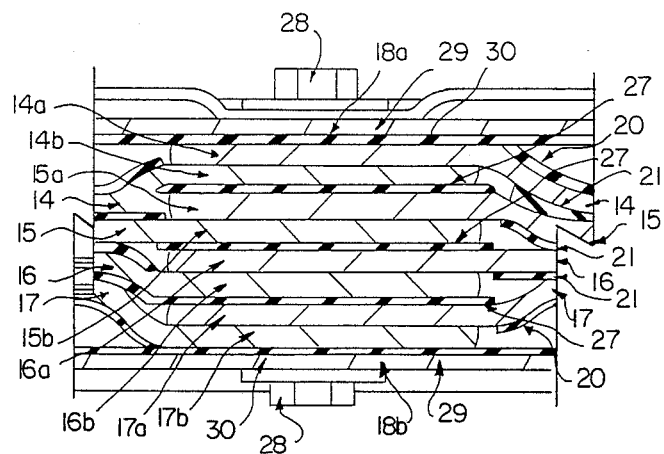
FIG. 5 is an enlarged side view of a joint between two bus bars of FIG. 1.

The upper and lower walls 18a, 18b of the duct 13 are separated from the bus bars 14 and 17 respectively by duct insulation sheets 20 to provide electrical insulation between the duct 13 and the bus bars as seen in FIG. 5. The bus bars are separated from one another by bus bar insulation sheets 21 as also seen in FIG. 5 to provide electrical insulation between adjacent bus bars. The insulation sheets 20 and 21 naturally extend the entire length of the duct 13 and extend beyond the duct 13 into the joint sections 12. The insulation sheets 20 and 21 extend laterally beyond the edges of the bus bars and intermesh with extruded rubber side insulators 22 as shown in FIG. 3 which are designed to electrically insulate the bus bars from the duct side walls 19 and to substantially seal the bus bars within the duct 13 to prevent an electrical conduction path around the edges of the insulating sheets 20 and 21 in the event of ingress of moisture. The bus bars 14, 15, 16 and 17 and insulation 20, 21 are in intimate contact with each other and with the duct 13 as described to provide direct heat transfer from the bus bars to the duct by way of conduction to the outer surfaces of the duct 13 to remove any excess heat generated due to current overloads or short circuit in or between the bus bars. The bus bars and associated insulation are rigidly nestled within the duct 13 over substantially its entire length to counteract any excessive reactance or repulsion effects between bus bars which may occur with any current overload or short circuit condition when in use.

The duct sections 13a, 13b, as previously described are of extruded metal of substantially U shaped cross-section and preferably include a plurality of integrally formed fins 23 as shown in FIG. 3 to increase the surface area of the duct 13 and to increase dissipation of heat generated as described above. Fin 23 may also provide a means of substantially even overall surface heat dissipation.

The joint fins 24 as also shown in FIG. 3, at the center joint line 25 of the duct 13 include appropriate holes for provision of bolts 26 to hold the assembled combination 10 together. The joint fins 24 provide additional reinforcement of upper and lower duct walls 18 against any repulsion occurring between the bus bars for reasons described above.

At the joint sections 12, the bus bars, which as previously described, extend beyond the ends of the duct 13, are splayed apart to permit interleaving of the bus bars to provide for electrical connection of serially disposed bus bar and duct combination sections. The interleaving bus bars and duct 13 are adapted for mutual mating coupling.

As will best be seen in FIG. 5, the bus bars 14, 15, 16 and 17 are splayed apart at their ends to form substantially parallel joint sections 14a, 14b, 15a, 15b, 16a, 16b and 17a, 17b. The insulation sheets 20 and 21 terminate short of the joint sections eg. 14a, 14b to permit interleaving of the bus bars to form the joint section and to permit electrical contact between pairs of bus bars 14a and 14b, 15a and 15b etc. Interposed between these electrically connected pairs of bus bars are joint insulators 27 to provide electrical insulation between the neutral and three active phase bus bar pairs 14a, 14b and 15a, 15b, etc.

Figure 4:
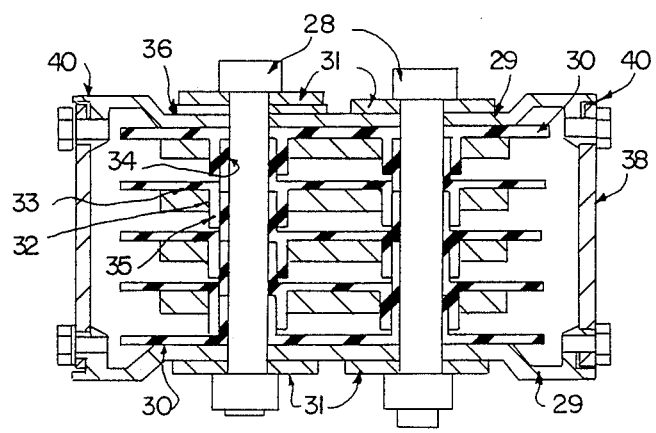
FIG. 4 is a cross-sectional view in the direction A—A of FIG. 1.

The junction is held together to provide good contact between the member bars of the bus bar pairs by means of junction nut/bolt 28 and washer 31 combination together with joint cover plates 29 and appropriate junction plate insulation 30 233 as shown in FIGS. 4 and 5. Furthermore, each bolt/nut combination is provided with a number of bolt insulators 32 seen in FIG. 4 having a tubular sleeve section 33 and 35 and an intermediate flange 34.

Referring to FIG. 4, the upper sleeve portion 33 of one tubular section is adapted to fit within the face of the lower sleeve portion 35 and the bore of the combination adapted to receive and insulate bolt 28. Flange sections 34 extend laterally and overlap with joint insulators 27 and plate insulators 30 to ensure adequate electrical insulation of the parts of the joint from one another. The bolt/nut combination 28 is in electrical contact with earth connection 36 which is also in electrical connection with duct 13 by means of earth bolts 37.

The joint is stabilized by way of fish plates 38, seen in FIGS. 1, 2 and 4, which cooperate with fish plate flanges 39 on duct 13 and also with cover plate flanges 40 on joint cover plate 29 as shown in FIG. 4. The fish plate is held, in place by ., way of nut and bolt combinations 41 as shown in FIGS. 1 and 2.

The entire bus bar and duct combination is substantially sealed, e.g., by way of molded neoprene rubber collar 42 shown in FIGS. 1 and 2. Additionally neoprene rubber sealing material may be included at the splay of the bus bars as shown at 43 in FIG. 1.

The bus bar and duct combination preferably includes slots 44 at the joint sections of the bus bars, as best seen in FIG. 2, to facilitate assembly of a series of bus bar duct combinations as described.

Figure 6:
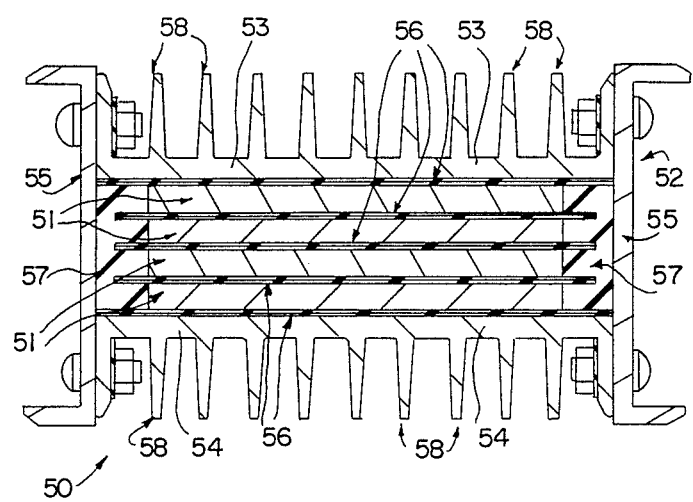
FIGS. 6 and 7 are cross-sectional elevations similar to FIG. 4 showing alternate duct configurations according to the invention.

Referring to FIG. 6, there is shown, a further embodiment of the present invention in cross-section similar to FIG. 4, a bus bar and duct combination 50 comprising four bus bars 51 encased in duct 52 as previously described. The duct 52 comprises extruded aluminium alloy upper 53 and lower 54 sections and side sections 55. The bus bars 51 are, as before, separated from one another and from the upper and lower duct sections 53,54 by appropriate insulation 56. The bus bars 51 are also, as before, separated from the side duct sections 55 by means of insulation 57 preferably, neoprene rubber. The upper and lower duct sections 53 and 54 are each integrally formed by extrusion and include mechanical strengthening and cooling fins 58.

Figure 7:
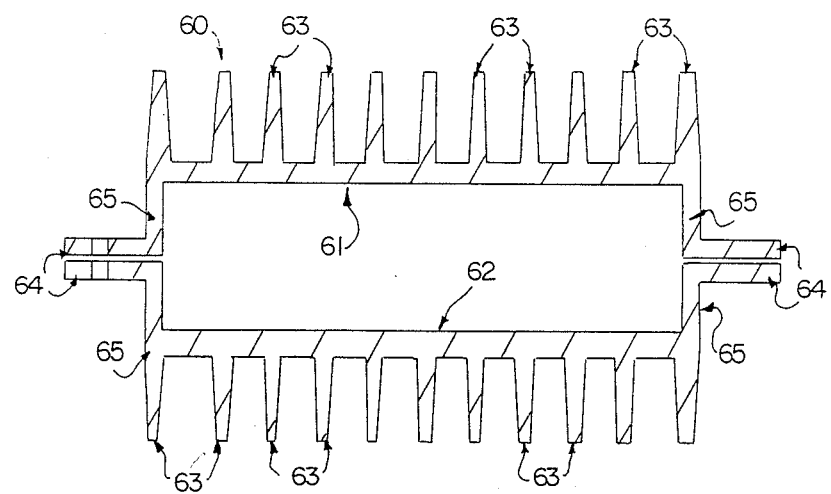

Referring to FIG. 7, there is shown in an cross-section similar to FIG. 6, a duct 60 comprising two extruded aluminium alloy duct sections 61 and 62 integrally formed with mechanical strengthening and cooling fins 63. Integrally formed flanges 64 on duct side sections 65 permit the duct when assembled to rigidly encase and support bus bars, not shown.

Figure 8:
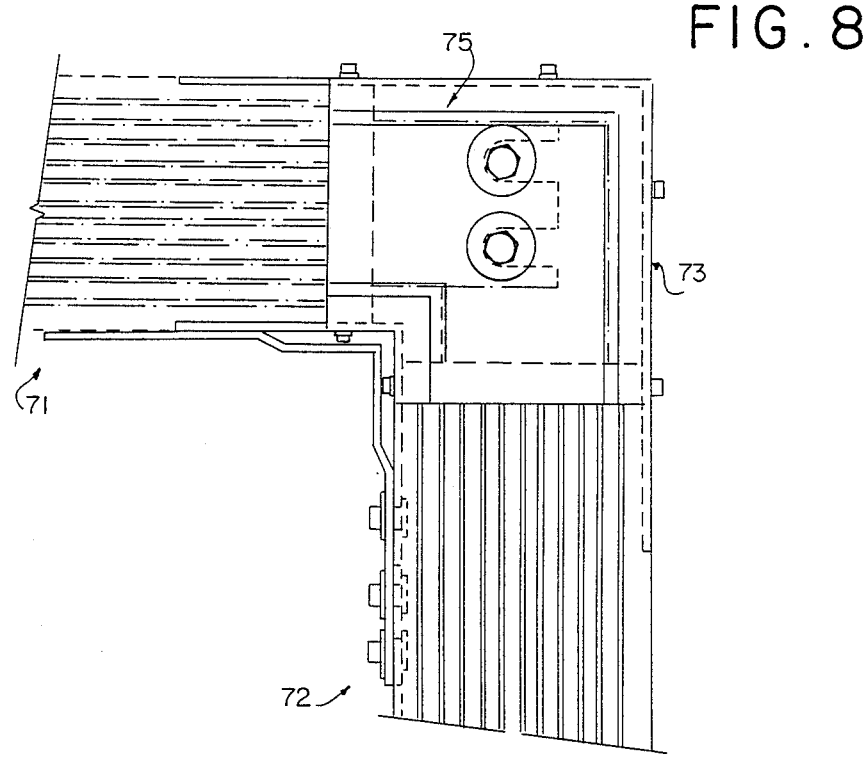
FIGS. 8 and 9 show joint bus bar and duct combinations in accordance with the invention.
Figure 9:
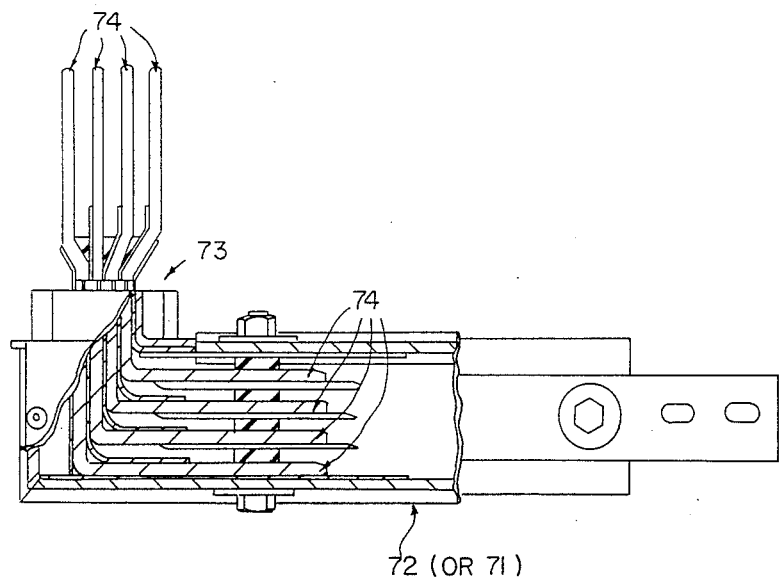

Referring to FIGS. 8 and 9, there is shown alternative joint construction for joining two bus bar and duct combinations 71 and 72. The combinations are joined at right angles to permit the bus bar and duct combination to be routed in a different direction. The combinations 71 and 72 are connected together by means of joint piece 73 as shown best in FIG. 9. The joint piece 73 includes bus bars 74 as previously and splayed to interleave with bus bars not shown of combinations 71 or 72 as has previously been described. Suitable insulation (not shown) and cover plate(s) 75 are included to provide rigidity and moisture resistance to the joint.

Figure 10:
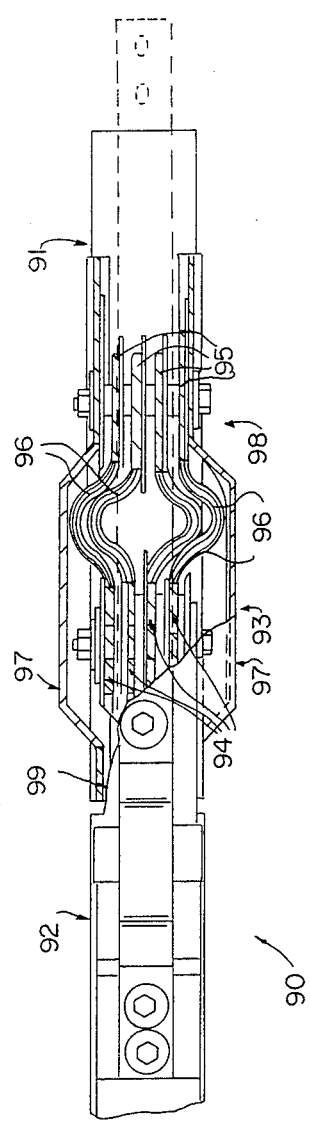
FIG. 10 shows an expansion joint bus bar and duct combination in accordance with the invention.

Referring to FIG. 10, there is shown generally at 90 a further alternative joint construction for joining two bus bar and duct combinations 91 and 92 in the form of an expansion joint 93. The expansion joint 93 includes a plurality of bus bar connection plates 94 and 95 for individual electrical connection with the corresponding bus bars of the combinations 90 and 91. The plates 94 and 95 are connected by flexible expansion means 96 comprising a plurality of leaves or laminations of aluminium or copper sheet covered with a heat shrink plastics material to electrically insulate the expansion means 96 one from another as the joint moves as a result of the variations of the heat generated in the bus bar and duct combination from periods of low electrical current to periods of peak electrical current flow through the system. The joint includes cover plate or plates 97 fixed at one end 98 to combination 91 and free to move at the other end 99 in relation to the other combination 92 as the movement due to heat expansion of the combinations dictates.

Figure 11:
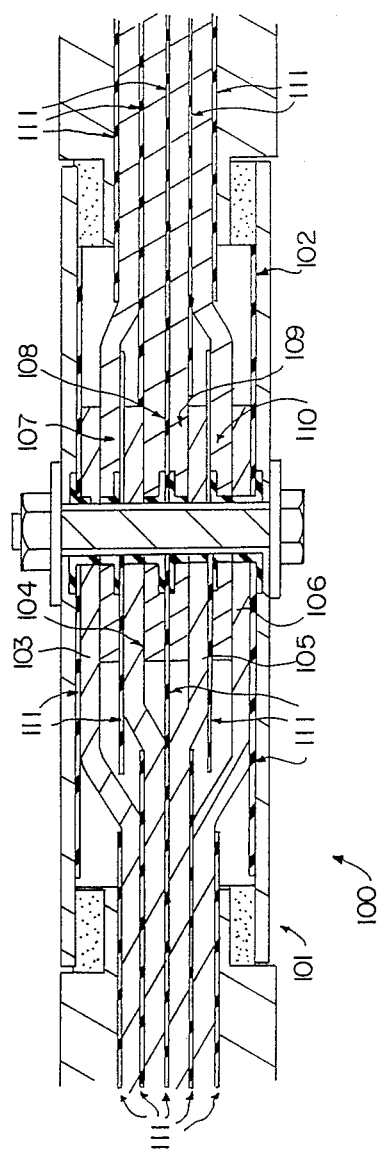
FIG. 11 shows an alternate joint detail of bus bar and duct combination in accordance with the invention.

Referring to FIG. 11, there is shown an alternative form of joint construction 100 (similar to that shown in FIG. 5) between two bus bar and duct combinations 101 and 102. The bus bars 103, 104, 105 and 106 of combination 101 are splayed to interleaf with bus bars 107, 108, 109 and 110 of combination 102. The bus bars as before are appropriately separated, as and where required, by insulation means 111 in similar manner as hereinbefore described.

The bus bars are preferably of aluminium metal but may be of copper if greater current carrying capacity is required or may be made of any other suitable metal or metal alloy or conductor. The insulating material may be of any suitable material and is preferably a pressed urethane fibreglass sheet material of, for example, 1/16 to 1/32 inch (1.6 to 0.8 mm approximately) thick. The bus bar and duct systems may be of any convenient length and most usually of 12 foot or 3.5 m in length. In the alternative, the earth connection between serially connected bus bar and duct sections may be established by the joint cover plates or the fish or joining plates.

Whilst there is described herein a preferred form of the invention it will be readily apparent to those skilled in the art that modifications may be made to the bus bar and duct combination without departing from the spirit of the invention. For example, the bus bars have been described as being in a single stack of four substantially flat bars but they may equally well be constructed in a two by two stack. The bus bars may even be of quarter circular cross-section such that the bundle of four bus bars with appropriate insulation therebetween, forms a cylindrical bus bar combination which is then encased in tubular insulation and a bus duct of two hemi-cylindrical cross-section extruded metal duct sections.

Furthermore, the duct sections instead of being jointed along plane/line 25 may be jointed along a plane/line parallel to the bus bars themselves.

I claim:

1. A bus duct including a plurality of bus bars stacked in substantially parallel flat-to-flat relationship within a housing, said bus bars having a joining means external of said housing, said housing comprising a first pair of walls each disposed one on either side, parallel to and longitudinally along said bus bars and a second pair of walls disposed transversely and longitudinally of said bus bars and fixed to said first pairs of walls to define a cavity within which said bus bars are accommodated, said first pair of walls and said bus bars being electrically insulated one from another by individual interposed sheets of separate insulating material, said second pair of walls and said bus bars being electrically insulated one from another by resilient insulation means disposed between the plurality of bus bars and the second pair of walls, each of said first pair of walls additionally including a plurality of integrally formed outwardly projecting longitudinally disposed cooling fins, said bus bars, insulating material of said interposed sheets and the resilient insulation means, and first pair of walls being held in intimate contact with one another to provide conductive heat transfer from said bus bars to said cooling fins and so that said bus bars are rigidly held along substantially their entire length by said housing.

2. A bus duct as claimed in claim 1, wherein the housing comprises two complementary shaped integrally formed extruded sections which forms said first and second pairs of walls and said cooling fins.

3. A bus duct as claimed in claim 1, wherein the walls of the housing are of substantially uniform thickness.

4. A bus duct as claimed in claim 1, wherein the cooling fins also provide additional mechanical strength to the first pair of walls.

5. A bus duct as claimed in claim 1, wherein said first pair of walls and said bus bars are electrically insulated one from another solely by said individual interposed sheets of separate insulating material, and said second pair of walls and said bus bars are electrically insulated one from another solely by the resilient insulation means disposed between the plurality of bus bars and the second pair of walls.

6. A bus duct as claimed in claim 1, wherein the duct is formed such that dissipation of heat therefrom is substantially equal over the duct in a direction substantially parallel to the planar portion of the bars.

* * * * *